(12) United States Patent
Yoshizumi

(10) Patent No.: US 8,930,142 B2
(45) Date of Patent: Jan. 6, 2015

(54) ROUTE SELECTION SYSTEM, METHOD AND PROGRAM

(75) Inventor: Takayuki Yoshizumi, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/989,222

(22) PCT Filed: Nov. 8, 2011

(86) PCT No.: PCT/JP2011/075664
§ 371 (c)(1),
(2), (4) Date: May 23, 2013

(87) PCT Pub. No.: WO2012/070379
PCT Pub. Date: May 31, 2012

(65) Prior Publication Data
US 2013/0238242 A1    Sep. 12, 2013

(30) Foreign Application Priority Data

Nov. 26, 2010   (JP) .................................. 2010-263649

(51) Int. Cl.
   *G01C 21/34*   (2006.01)
   *G08G 1/123*   (2006.01)

(52) U.S. Cl.
   CPC ........ *G01C 21/3492* (2013.01); *G01C 21/3446* (2013.01)
   USPC ....................................................... 701/533

(58) Field of Classification Search
   None
   See application file for complete search history.

(56) References Cited

U.S. PATENT DOCUMENTS

| | | | |
|---|---|---|---|
| 6,169,495 B1* | 1/2001 | Koike | 701/302 |
| 2008/0262716 A1* | 10/2008 | Li | 701/201 |
| 2009/0175171 A1* | 7/2009 | Nikolova et al. | 370/238 |
| 2012/0310691 A1* | 12/2012 | Carlsson et al. | 705/7.13 |

FOREIGN PATENT DOCUMENTS

| | | |
|---|---|---|
| JP | 06-003156 A | 1/1994 |
| JP | 08-240438 A | 9/1996 |
| JP | 09-022497 A | 1/1997 |
| JP | 11-094579 A | 4/1999 |
| JP | 2000-194894 A | 7/2000 |
| JP | 2001-036574 | 2/2001 |
| JP | 2001-331564 A | 11/2001 |
| JP | 2003-141222 A | 5/2003 |
| JP | 2004-012312 A | 1/2004 |
| JP | 2004-205234 A | 7/2004 |

(Continued)

*Primary Examiner* — John R Olszewski
*Assistant Examiner* — David Merlino
(74) *Attorney, Agent, or Firm* — Vazken A. Alexanian; Maeve L. McCarthy

(57) ABSTRACT

A method for obtaining a many-to-many route searching process with a reasonable amount of computation. The method includes preparing a graph expressing road segments as edges and route intersections as nodes, the weight of each road segment being approximated by a monotonically increased piecewise linear function, searching the graph for the shortest routes, establishing the obtained routes as a set of routes to be processed, solving an objective function so as to minimize the maximum value obtained by dividing the required time from each departure point to each destination point by the shortest required time with respect to the set of a plurality of departure points and destination points, and removing those routes whose minimum cost is greater than or equal to that of the current best solution, and any unused routes added in the previous iteration, while repeating the solving of the objective function.

19 Claims, 6 Drawing Sheets

(56) References Cited

FOREIGN PATENT DOCUMENTS

| | | |
|---|---|---|
| JP | 2005-331305 A | 12/2005 |
| JP | 2006-018443 A | 1/2006 |
| JP | 2009-19932 A | 1/2009 |
| JP | 2009002848 A | 1/2009 |
| JP | 2010-112797 A | 5/2010 |
| WO | WO/2005/048018 | 5/2005 |

* cited by examiner

ROUTE SELECTION SYSTEM, METHOD AND PROGRAM

CROSS-REFERENCE TO RELATED APPLICATION

This application is a National Phase application based on PCT/JP2011/075664 which claims priority from Japanese Patent Application No. 2010-263649 filed Nov. 26, 2010, the entire contents of both of which are incorporated herein by reference.

BACKGROUND OF THE INVENTION

1. Field of the Invention

The present invention relates to a system, a method, and a program for selecting routes such as traffic routes.

2. Description of Related Art

Car navigation systems have a function which searches for and displays traffic routes. The algorithm in this process, for example, treats intersections as nodes and road segments as edges, and searches for the shortest route in a weighted graph in which the lengths of routes are weighted.

However, at this time, a large number of automobiles have car navigation systems that are used to simultaneously search for routes, and each automobile independently determines the shortest route. When this causes an overlap of traffic routes for a plurality of automobiles, the frequency of use of particular routes or edges increases, and congestion occurs in some of these routes. At this time, as shown in FIG. 1, the times for each route are believed to increase rapidly as traffic volume increases.

In automobiles, traffic information provided by the Vehicle Information and Communication System (VICS) is referenced so that the car navigation system can calculate an alternate route. However, when a large number of vehicles reference the same traffic information, similar alternate routes are eventually selected and this causes further congestion as shown in FIG. 2.

Therefore, there is a need for a central server to take into account the occurrence of congestion due to a concentration of vehicles and, as shown in FIG. 3, perform many-to-many routing to alleviate congestion. In other words, there is a possibility of reducing required times if congestion can be mutually avoided. However, the calculations performed in many-to-many routing usually experience difficulties, and it is difficult to come up with a solution in a reasonable amount of time.

A system is disclosed in Japanese Patent Publication No. 2001-331564 for realizing an effective plan by calculating routes for each means of transport in a transportation plan using a means optimized for the necessary precision and calculation time of each plan. This system, which has at least an input/output device, a processor and a storage device, and which creates a distribution plan, comprises: a base information registration step for inputting position information for a base such as a factory, a relay base, and a supplier, a transportation service information registration step for inputting transportation delivery information including bases that each transportation service visits and load quantities, a condition registration step for inputting target information including the necessary accuracy and limit time of a transportation plan, an algorithm selection step for selecting an algorithm used for route preparation, a route preparation step for preparing a route for a delivery service from this information, and an output step for outputting the result.

Japanese Patent Publication No. 2004-12312 discloses a route searching device comprising a first searching means for searching for a minimum cost route along which the parameter accompanying the route becomes the minimum among the parameters accompanying the routes from a starting point to a destination, a weighting means for weighing the parameter of each road section constituting a first shortest route, and an area limiting means for finding a specific map area as a limited area based on the calculated data of the first searching means. This device also comprises a second searching means for searching for a route only in the limited area found by means of the area limiting means by regarding the area as an object to be searched. The time required for a subsequent search is shortened by limiting the search range by utilizing information obtained during the previous search.

Japanese Patent Publication No. 2009-19932 discloses a route search system for searching for a moving route for an autonomous moving body reaching a moving end point from a moving start point, which comprises a region dividing portion for dividing a moving region into a plurality of regions, a plurality of evaluation value calculating portion for calculating an evaluation value of each region, corresponding to the plurality of regions divided by the region dividing part, and a route determining portion for determining the route, based on the evaluation values calculated by the evaluation value calculating parts. The evaluation value calculating portion has an evaluation value processing portion for calculating an evaluation value based on the evaluation value of a region existing nearby and moving cost from a nearby region to its own region. Paragraph 0073 states that "the number of regions indicated as moving start points and moving end points can be applied to the present invention whether it is many-to-one, one-to-many, or many-to-many.

However, none of the prior art literature discloses a technique for obtaining many-to-many route search processing with a reasonable amount of computation, even though a simple solution requires an enormous amount of computation.

SUMMARY OF THE INVENTION

Therefore, it is an object of the present invention to provide a technique for obtaining a many-to-many route searching process with a reasonable amount of computation.

It is another object of the present invention to provide a technique for obtaining a route searching process with a reasonable amount of computation and while taking into account the level of congestion due to the transit of a plurality of vehicles.

In the present invention, the occurrence of congestion due to an increase in traffic volume is modeled by describing traffic routes as a graph, and approximating the required time of each edge using a monotonically increased piecewise linear function. This model approximates a curve of the relationship between levels of congestion and required times shown in FIG. 1.

When information is requested by a car navigation system indicating a departure point and a destination point, all of the vehicles can be treated fairly and completely rational routing can be realized using an objective function in which "the maximum value of all values obtained by dividing the actual required time for all requests by the shortest required time is minimized". This finding of the present invention can be described as a mixed integer programming (MIP) problem, and solved using a predetermined solver.

However, the MIP description requires the explicit enumeration of all possible routes, and the number of candidate routes could be exponential in accordance with the size of the graph. This implies that this problem is an NP-hard problem and difficult to solve in reality.

In a characteristic of the present invention, the number of candidate routes could be exponential, but an explosion in the number of candidate routes is suppressed by solving the MIP problem while gradually and repeatedly adding promising routes from the initial state.

In another characteristic of the present invention, by searching for new routes using the actual routes at the end of an iteration, routes with a high utility value are preferentially searched for as alternate routes. At this time, any route having a minimum cost greater than the best solution at the time, and any unused route added in the previous iteration is removed as an unpromising route.

In another characteristic of the present invention a plurality of routes from a departure point to a destination point are obtained along with their utilization ratio as a result of MIP calculations. These results can be used to optimize routing so as to alleviate congestion.

In yet another characteristic of the present invention, by keeping the routes used during the previous iteration when updating the route candidates, the solution of the previous iteration can be used as the initial value in the MIP problem, and the computation time can be greatly reduced.

In the present invention, many-to-many routes can be calculated with a reasonable amount of computations by using a mixed integer programming problem and by removing unpromising routes and keeping routes used in the previous iteration so as to start iterative calculations from a promising value.

In the present invention, the desired routing can be obtained which alleviates congestion using a reasonable amount of computation by approximating the required times of each edge using a monotonically increased piecewise linear function.

DETAILED DESCRIPTION OF THE PREFERRED EMBODIMENTS

The following is an explanation of an example of the present invention with reference to the drawings. The same reference numbers are used to denote the same objects in all of the drawings except where otherwise indicated. The following explanation is of an embodiment of the present invention, and the present invention is by no means intended to be limited to the content explained in the example.

Figure 1:
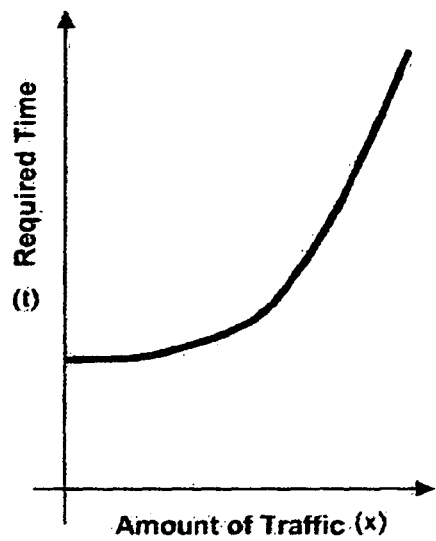
FIG. 1 is a diagram showing the relationship between traffic volumes and required times.
Figure 2:
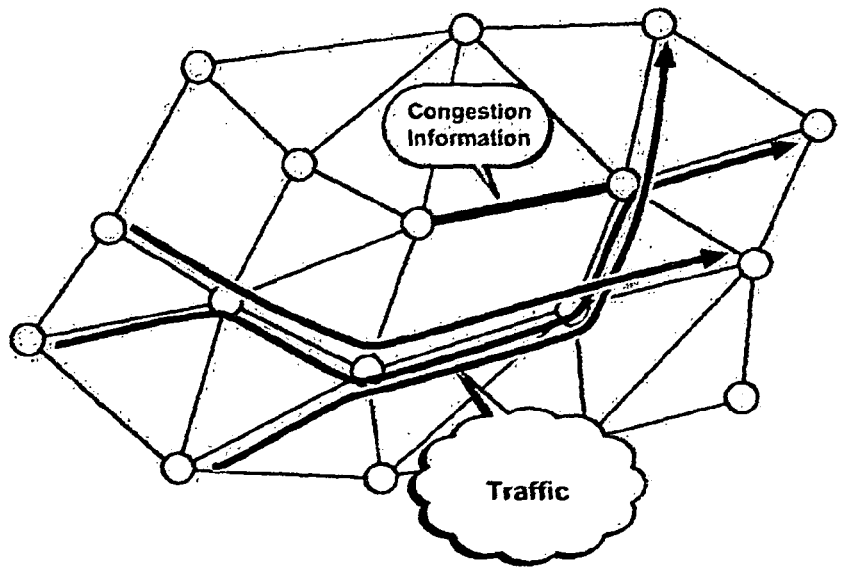
FIG. 2 is a diagram showing how a vehicle avoids a certain route using congestion information.
Figure 3:
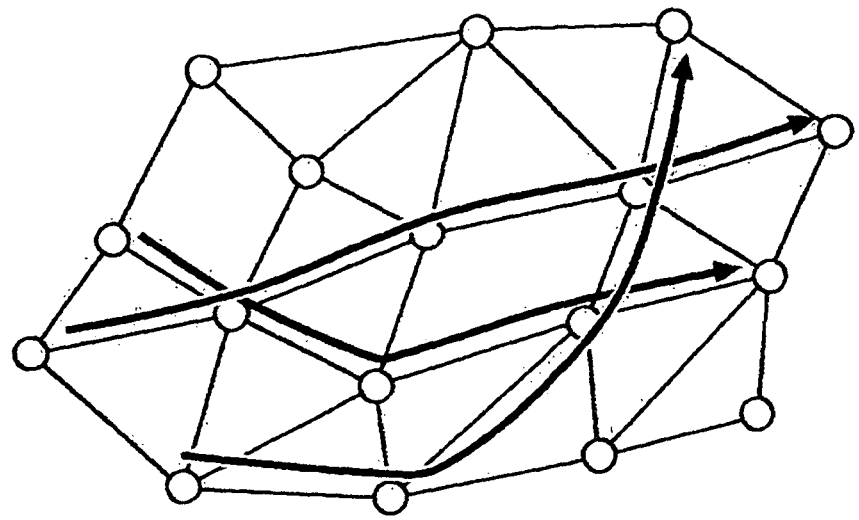
FIG. 3 is a diagram showing how a vehicle is guided to a route in the appropriate manner.
Figure 4:
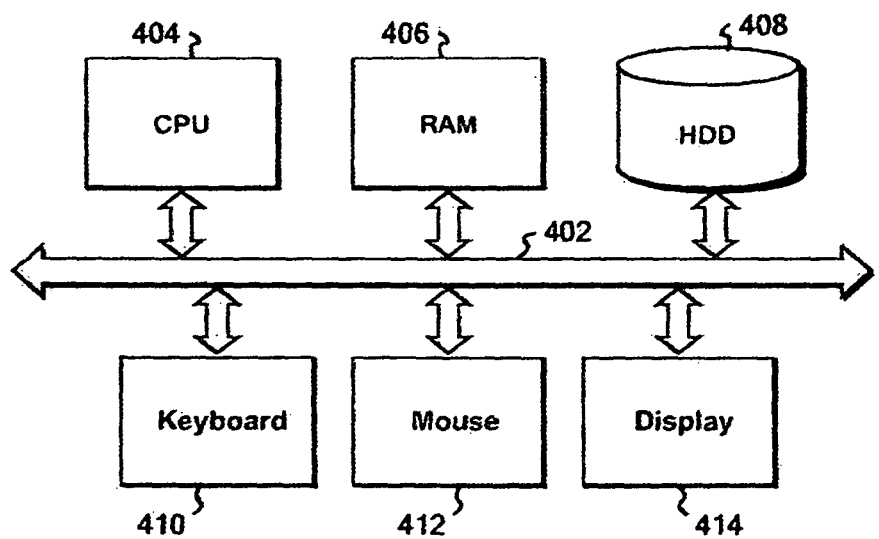
FIG. 4 is a block diagram of an example of a hardware configuration used to embody the present invention.

FIG. 4 is a block diagram of computer hardware used to realize the system configuration and processing in an example of the present invention. In FIG. 1, a CPU 404, main memory (RAM) 406, a hard disk drive (HDD) 408, a keyboard 410, a mouse 412, and a display 414 are connected to a system bus 402. The CPU 404 is preferably based on 32-bit or 64-bit architecture, and can be a Pentium® 4, Core® 2 Duo or Xeon® from Intel Corporation, or an Athlon® from Advanced Micro Devices, Inc. The main memory 406 preferably has a capacity of 4 GB or more. The hard disk drive 408 preferably has a capacity of 500 GB or more in order to store a large amount of data. Main memory 406 and hard disk drive 408 are examples of computer readable storage mediums. Computer readable storage mediums are hardware capable of storing information such as data, computer readable instructions, program code in functional form, and/or other suitable information on a temporary basis and/or permanent basis.

A preferred example of such a hardware configuration is the IBM® System X series. However, the present invention is not limited to this. It can even be embodied in a personal computer.

While not shown in any of the drawings, the hard disk drive 408 includes a pre-installed operating system. The operating system can be any operating system compatible with the CPU 404. Examples include Linux®, Windows XP®, Windows 2000®, and Windows 2008 Server® from Microsoft Corporation, or Mac OS® from Apple, Inc.

The hard disk drive 408 stores the main routine 502, traffic route graph data 504, request data 506, solver 508, route searching module 510, and route updating module 512 described below.

The main routine 502, solver 508, route searching module 510, and route updating module 512 are created in an existing programming language such as C, C++, C# or Java™, and are loaded into the memory 406 at system startup and by the action of the operating system, if necessary.

The display 414 is preferably a liquid crystal display. Any resolution can be used, including XGA (resolution: 1024× 768) or UXGA (resolution: 1600×1200). While not shown in the drawings, the display 414 is used to display operating screens for starting and stopping the processing program of the present invention, and for displaying traffic route data.

Figure 5:
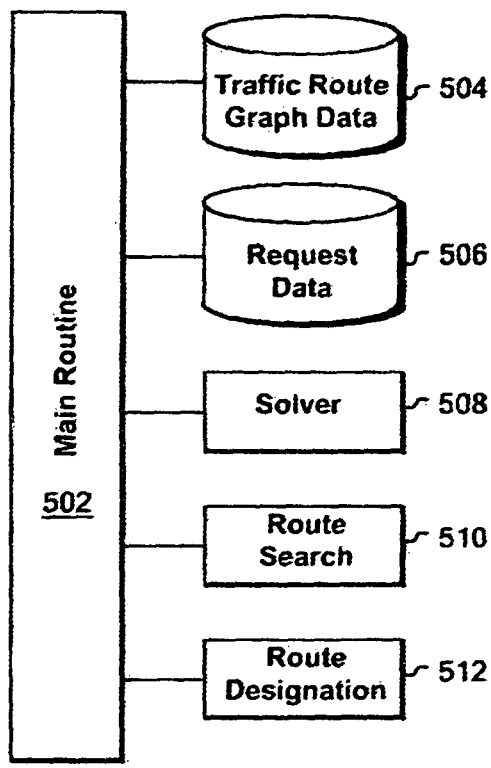
FIG. 5 is a block diagram of an example of a functional configuration used to embody the present invention.

The following is an explanation of the logic function structure used to embody the present invention with reference to the function block diagram of FIG. 5. In FIG. 5, the main routine 502 is the program that manages the overall process, displays operating screens (not shown) on the display 414, and starts and stops the process in response to user operations entered using the keyboard 410 and mouse 412.

The traffic graph data 504 is weighted graph data in which routes are described in graph form with roads expressed as edges and intersections as nodes, and in which the weight of each road is approximated by a monotonically increased piecewise linear function to model the occurrence of congestion due to an increase in traffic volume. The graph is typically expressed as a matrix or list to make it computer readable and storable in media such as a hard disk. However, the graph can assume any form able to achieve the object of the present invention.

Figure 6:
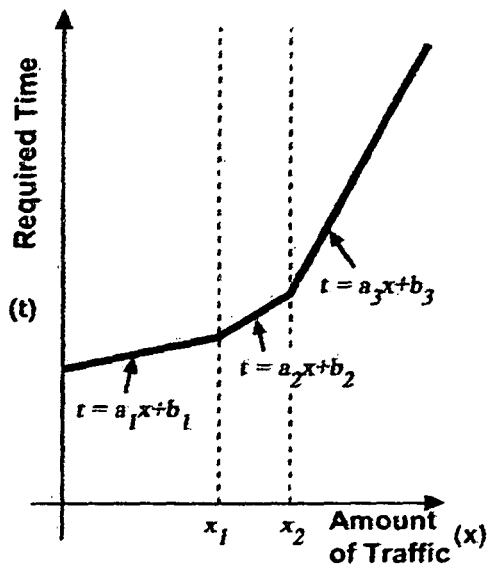
FIG. 6 is a diagram showing how to approximate using a monotonically increased piecewise linear function.

FIG. 6 is a diagram showing the piecewise linearity of the edges and required times. Here, x is traffic volume expressed in the number of vehicles transiting per hour. This is a piecewise linear approximation of the graph shown in FIG. 1. As shown in the drawing, the piecewise linear functions used are required time $t=a_1 x+b_1$ where $0 \leq x < x_1$, required time $t=a_2 x+$ $b_2$ where $x_1 \leq x < x_2$, and required time $t = a_3x + b_3$ where $x_2 \leq x$, where $a_i > 0$ (i=1, 2, 3). Here, only three zones are shown, but this is merely an embodiment. If necessary, zones of any number and width can be used. The piecewise linear functions are not limited to this. For example, it can be implemented as a linear function indicated from each edge and referencing a table in memory. In other words, a table is prepared so that $\{a_1, b_1\}$ is returned in response to a value for traffic volume of $\leq x_1$, and $\{a_2, b_2\}$ is returned in response to a value for traffic volume of $x_1 \leq x < x_2$, etc.

The coefficient groups such as $\{a_1, b_1\}$, $\{a_2, b_2\}$ for performing piecewise linear approximation of each edge are determined according to the actual condition of the road. In other words, a coefficient such as $\{a_i, b_i\}$ (i=1, 2, 3, etc.) is preferably determined in proportion to the actual length of the edge. However, $\{a_i, b_i\}$ is made larger for a road going uphill, and $\{a_i, b_i\}$ is made smaller for a road going downhill. Also, $\{a_i, b_i\}$ is made larger for a road with a large curve, $\{a_i, b_i\}$ is made smaller for a road with many lanes, and $\{a_i, b_i\}$ is made larger for a narrow road. In addition, $\{a_i, b_i\}$ is made smaller for a road with good pavement, and $\{a_i, b_i\}$ is made larger for a road with no pavement.

In a preferred example, the required time for each edge is $t = \max_i\{a_ix + b_i\}$. Here, $a_i > 0$.

The request data 506 is provided as a set of {departure point, destination point, demand level}. This request data can be collected, for example, using probe car data. Traffic data collection techniques using probe car data are common in the art. For examples, see Japanese Patent Publication No. 2004-110458, Japanese Patent Publication No. 2004-156982, Japanese Patent Publication No. 2007-193705, and Japanese Patent Publication No. 2004-241987. Because the number of vehicles traveling between each {departure point, destination point} pair is known over a given period of time, these techniques can be used prepare request data 506 so that the number of vehicles is set as the level of demand, the {departure point, destination point, demand level} sets are sorted in descending order by level of demand, and a predetermined number of pairs is saved from the top to a hard disk drive 408.

The solver 508 uses as the objective function a minimized maximum value of all values obtained by dividing the actual required time for all requests by the shortest required time, and solves a mixed integer programming (MIP) problem, providing as output to each request a plurality of routes and their utilization ratio (real number). There are no restrictions on the solver, but a preferred example is IBM® ILOG CPLEX. The MIP formulation is explained below in greater detail.

The route searching module 510 performs a weighted graph route search using any well-known algorithm such as Dijkstra's Algorithm or an A* search technique. The algorithm can also be a revised A* search technique described in Japanese Patent Publication No. 2008-157698.

The route updating module 512 arbitrarily eliminates routes in order to reduce the amount of computation or adds useful routes. The process executed by the route updating module 512 is explained in greater detail below with reference to the flowchart in FIG. 8.

Figure 7:
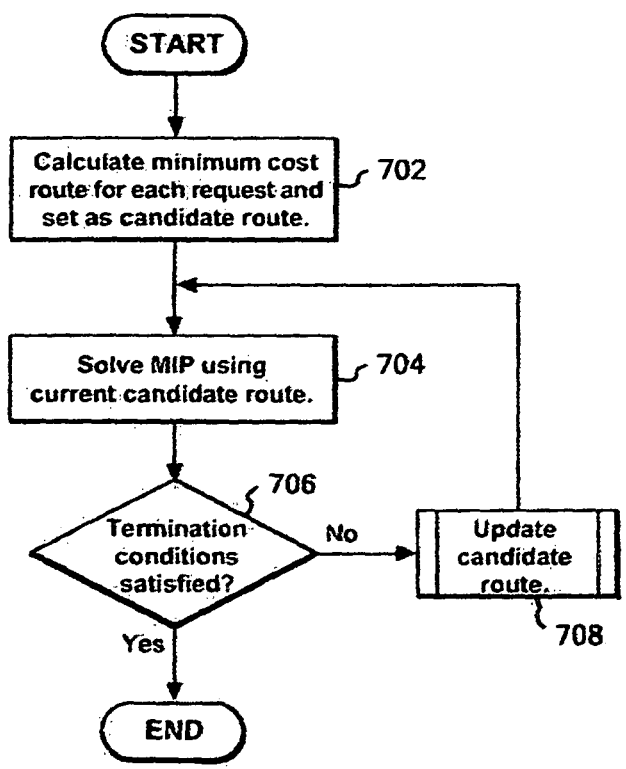
FIG. 7 is a diagram showing a flowchart of the route selecting process of the present invention.
Figure 8:
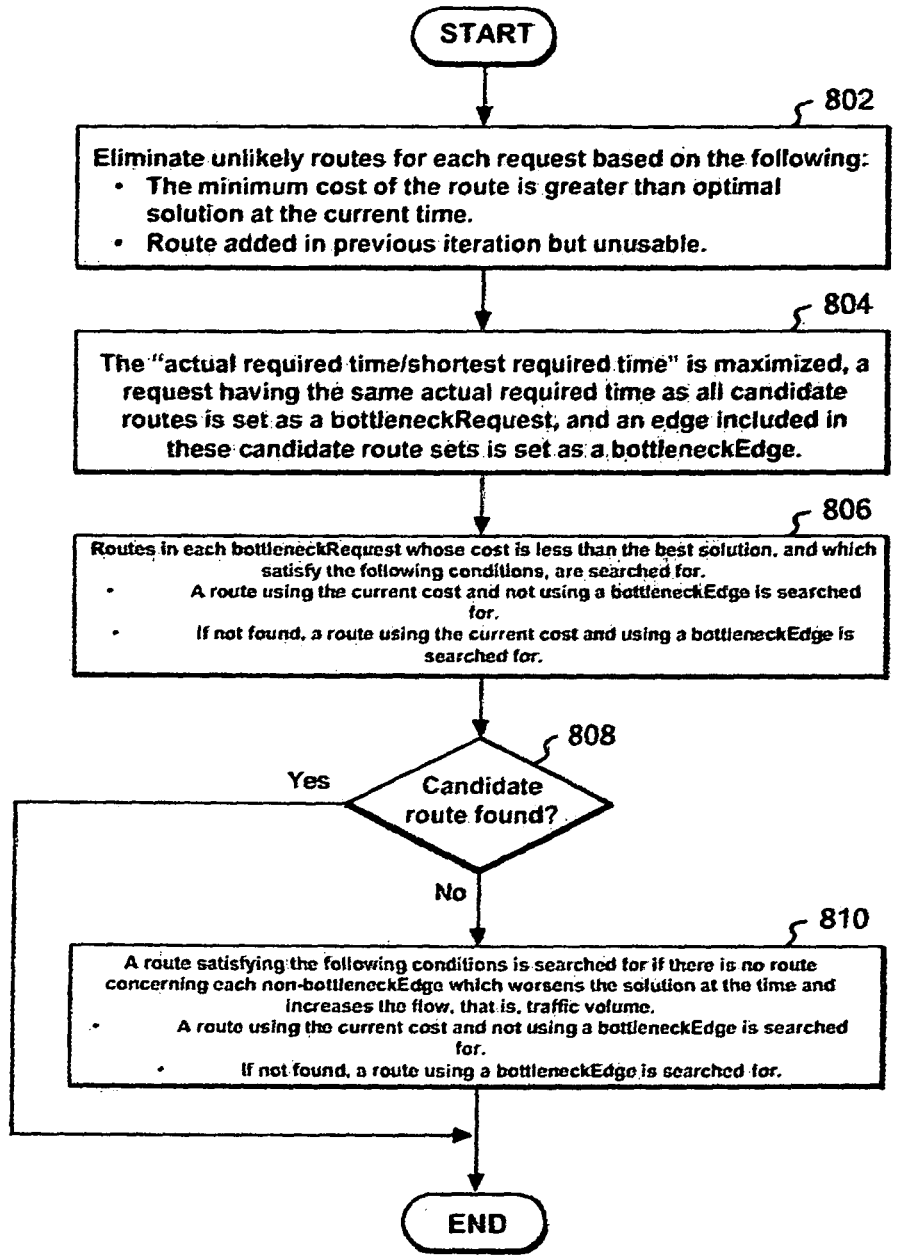
FIG. 8 is a diagram showing a flowchart of the route selecting process of the present invention.

The following is an explanation of the route selecting process of the present invention with reference to the flowchart in FIG. 7 and FIG. 8.

In Step 702 of FIG. 7, the main routine 502 calls up the route searching module 510, and searches for the lowest cost route, or shortest route, from a departure point to a destination point for the {departure point, destination point} pair in request data 506 where x=0 is placed in the formula for $t = \max_i\{a_ix + b_i\}$.

In Step 704, the main routine 502 calls up the solver 508, and solves a mixed integer programming (MIP) problem with the candidate routes at the present time. In the loop consisting of Step 704, Step 706 and Step 708, the calculation time can be reduced by using the previous solution as the initial value in the second and subsequent iterations.

The following is an explanation of the MIP formulation. The formulation is intended to use an objective function in which the maximum value of all values obtained by dividing the actual required time for all requests by the shortest required time is minimized. This is expressed as graph G=(V, E), where V is the set of nodes and E is the set of edges in the traffic graph data 504. Referencing the piecewise linear approximation in FIG. 6, the traveling time for moving along edge e E is expressed by the following equation, where the volume of traffic is x.

$$t_e(x) = \max_i(a_{ei}x + b_{ei})$$

Here, $a_{ei} > 0$.

Request i (i=1, k) has the following attributes.
The node of the departure point: $s_i$ V
The node of destination point: $g_i$ V
The level of demand: $d_i$ R, $d_i > 0$ Also, let $P_i^*$ be the set of all routes not including the cycle from node $s_i$ to node $g_i$. Then, p $P_i^*$ is expressed as a permutation of the connecting edge.

$$p = (e_1 \cdot e_2 \ldots, e_{|p|})$$

Here, |p| is the number of edges connected to p.

Therefore, let $T_i^*$ be the minimum required time from node $s_i$ to node $g_i$ when traffic volume x is 0. In other words, $T_i^*$ is expressed by the following equation.

$$T_i^* = \min_{p \in P_i^*} \sum_{e \in p} t_e(0) \quad \text{Equation 1}$$

At this time, let the cost of each edge e E be $t_e(0)$, and Ti* can be determined, for example, by calling up the route searching module 510 and executing the shortest route search algorithm, even though all of the elements of Pi* are not explicitly enumerated.

Also, sequential numbers are given to the elements of candidate route set $P_i^*$ for request i, and the jth route of $P_i^*$ (j=1, . . . , $|P_i^*|$) is expressed by $p_j$. In addition, L is a sufficiently large positive constant, and $y_{ij}$ is an integer variable, which takes 0 or 1 expressing whether or not candidate route j for request i is used. These definitions are used to formulate a mixed integer programming problem in the following manner.

$$\min \lambda \quad \text{Equation 2}$$

s.t.

$$Ly_{ij} + \sum_{e \in p_{ij}} t_e(x_e) \leq \lambda T_i^* + L \text{ for } i = 1, \ldots, k,$$

$$j = 1, \ldots, |P_i^*|$$

$$x_e = \sum_{(i,j) = \{i,j|e \in p_{ij}\}} x_{ij} \text{ for } e \in E$$

$$\sum_j x_{ij} = d_i \text{ for } i = 1, \ldots, k$$

$$x_{ij} \leq d_i y_{ij} \text{ for } i = 1, \ldots, k, j = 1, \ldots, |P_i^*|$$

$$x_{ij} \geq 0, x_{ij} \in R \text{ for } i = 1, \ldots, k, j = 1, \ldots, |P_i^*|$$

$$y_{ij} \in \{0, 1\} \text{ for } i = 1, \ldots, k, j = 1, \ldots, |P_i^*|,$$

where expressions below s.t. (such that) represent constraints.

Figure 9:
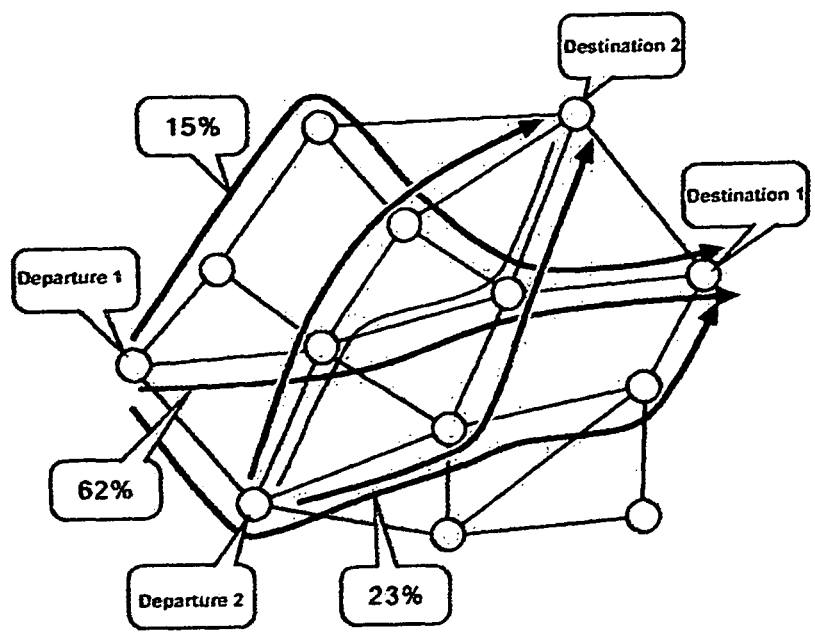
FIG. 9 is a diagram showing an example of output of the processing of the present invention.

Thus, $x_{ij}$ resulting from the solution of the mixed integer programming problem expresses the traffic volume of the jth route in request i. In other words, $x_{ij}/d_i$ is the utilization ratio of the jth route in request i. This utilization ratio is expressed in FIG. 9 as a percentage associated with each of a plurality of routes from the departure point 1 to the destination point 1.

Next, in Step 706, the main routine 502 determines whether or not the termination conditions have been satisfied. The termination conditions have been satisfied, for example, when the calculation time exceeds a time set in advance, or the number of iterations has exceeded a predetermined number.

When the main routine 502 has determined that the termination conditions have been satisfied, the process is terminated. At this time, a plurality of routes from the departure point to the destination point of each request, and the utilization ratio of each route are obtained.

When the main routine 502 in Step 706 determines that the termination conditions have not been satisfied, the process proceeds to Step 708, where the main routine 502 calls up the route updating module 512 and updates the candidate routes. The candidate routes are updated by deleting unused routes and unpromising routes, and adding promising routes. This process is explained below in greater detail with reference to the flowchart in FIG. 8.

After the candidate routes have been updated in Step 708, the MIP is again solved by the solver 508 in Step 704 based on the updated candidate routes.

The following is an explanation of the processing performed in the route updating module 512 with reference to the flowchart in FIG. 8. In other words, in Step 802, the route updating module 512 eliminates the following routes in each request as unpromising routes.

Those routes whose lowest cost is equal to or greater than the cost of current best solution. Here, the lowest cost is the cost when traffic volume x=0.

Those routes that was added in the previous iteration, but not used. An unused route is determined in the calculation results of the solver 508 in Step 704 by a value of 0 for variable $y_{ij}$.

An explosion in the number of candidate routes is suppressed by eliminating these routes.

In Step 804, the route updating module 512 sets those requests whose "actual required time/shortest required time" is maximum and "actual required time" for all the candidates is same to bottleneckRequest's, and sets those edges included in the candidate route to bottleneckEdge's. In other words, the route updating module 512 identifies bottleneck requests and bottleneckEdge sets in the results of each iteration. Those requests that determine the object function value are defined as bottleneckRequest's, and those edges included in candidate routes of the request are defined as bottleneckEdge's.

In Step 806, the route updating module 512 searches for routes in each bottleneckRequest whose cost is less than the current best solution which satisfy the following conditions.
With the current cost, those routes that do not use bottleneckEdge's will be searched.
If not found, with the current cost, those routes that may use bottleneckEdge's will be searched.
Any route found in this manner is added. In other words, routes which lower the objective function value when added, or routes with a high probability of lowering the objective function value can be efficiently added.

In Step 808, the route updating module 512 determines whether or not a candidate route was found in Step 806. If found, returning from the subroutine shown in FIG. 8, the process goes back to Step 704 in FIG. 7.

When the route updating module 512 determines in Step 808 that a candidate route was not found, the route updating module 512 in Step 810 searches for a route satisfying the following conditions if there is no route concerning each non-bottleneckEdge which worsens the solution at the time and increases the flow, that is, traffic volume.
With the current cost, those routes that do use bottleneckEdge's will be searched.
If not found, those route that may use bottleneckEdge's will be searched.
If a route is found, it is added. Returning from the subroutine shown in FIG. 8, the process goes back to Step 704 in FIG. 7.

The reason why the process in Step 810 is performed is that even those requests that are not bottleneck may improve the objective function value by adding candidate routes. At this time, for those requests that have the candidate routes satisfying the following conditions, the objective function value cannot be improved no matter which route is added for such the requests.
None of the edges of the candidate route is a bottleneckEdge and the route itself is not a route to determine the current objective function value.

These conditions assume the cost function of the edge is a cost function that strictly increases monotonically. In other words, for the required time function of the "ax+b", "a>0" should be used instead of "a 0".

Returning to the flowchart in FIG. 7, when the MIP has been calculated in Step 704 and it has been determined in Step 706 that the termination conditions have been satisfied, a plurality of routes is returned for each request, and a utilization ratio is returned for each route.

When the desired routes between many-to-many departure points and destination points and the utilization ratios of the desired routes have been obtained in this manner, those can be applied to the routing of traffic in order to alleviate steady or permanent congestion, such as during rush hour, and regular congestion around certain facilities.

It can also be applied to crowd control in order to plan efficient routes for crowd movement at event venues, and to plan effective evacuation routes in case of fire.

The present invention was explained with reference to a particular embodiment, and one type of hardware configuration was illustrated. However, the present invention can also be used in any other hardware environment, such as a multi-processor environment or a network-connected crown computing environment.

I claim:

1. A computer implemented method for selecting a route, the method comprising the steps of:
a computer preparing a graph expressing road segments as edges and route intersections as nodes, the road segments and the route intersections combining to form a first plurality of routes, and each road segment including a weight, the weight equal to a traveling time of each road segment;
the computer searching the graph for a second plurality of routes in response to each of a plurality of requests, each request including a set of points, each set including a departure point and a corresponding destination point;
the computer determining a minimum cost of each of the second plurality of routes, the minimum cost equal to a cost when traffic volume is zero, wherein the cost is equal to a sum of the weights of each road segment;
the computer establishing the second plurality of routes as a set of routes to be processed, each of the second plurality of routes including at least one set of points, and one or more road segments and one or more route intersections connecting the departure point and the corresponding destination point of the at least one set of points;

the computer solving an objective function, where the function iterates to minimize a maximum value obtained by dividing an actual required time of each of the second plurality of routes from each departure point to the corresponding destination point by the minimum cost of each of the second plurality of routes, wherein the actual required time is equal to the cost of each of the second plurality of routes;

the computer determining, based on the objective function, a current best solution, wherein the current best solution is one route of the second plurality of routes with a lowest value obtained by solving the objective function;

the computer determining the cost of the current best solution;

responsive to determining the current best solution, the computer removing (a) each of the routes whose minimum cost is greater than the cost of the current best solution, and (b) each of an unused route added in a previous iteration, wherein each unused route is a route of the first plurality of routes not contained in the second plurality of routes; and the computer repeating the solving of the objective function with each route of the second plurality of routes that is not removed.

2. The method for selecting a route according to claim 1, further comprising:

the computer adding to the set of routes to be processed any route lowering the objective function when added; and repeating the solving of the objective function.

3. The method for selecting a route according to claim 2, wherein adding to the set of routes to be processed further comprises:

the computer determining one or more route requests of the plurality of requests having a same actual required time as one or more candidate routes, wherein the one or more candidate routes include each route of the second plurality of routes that remains after the removing step;

the computer setting the determined one or more route requests as bottleneckRequests;

the computer setting an edge included with the one or more candidate routes as a bottleneckEdge; and the computer searching for one or more routes with a cost less than the current best solution, using the cost and not using the bottleneckEdge.

4. The method for selecting a route according to claim 3, further comprising:

the computer searching for one or more routes using the bottleneckEdge in response to not finding a route in the step of searching for one or more routes using the cost and not using the bottleneckEdge.

5. The method for selecting a route according to claim 3, wherein adding to the set of routes to be processed further comprises:

the computer determining a candidate route was not found; and the computer searching for one or more routes using the cost and not using the bottleneckEdge when there is no route concerning each non-bottleneckEdge worsening a solution to the objective function.

6. The method for selecting a route according to claim 5, further comprising:

the computer searching for one or more routes using the bottleneckEdge in response to not finding a route in the step of searching for one or more routes using the cost and not using the bottleneckEdge.

7. The method for selecting a route according to claim 1, wherein the objective function is solved by a solver.

8. The method for selecting a route according to claim 7, wherein each of the plurality of requests further includes a demand level, wherein the demand level is a number of vehicles traveling between each departure point and corresponding destination point, and the solver outputs a percentage of the demand level for a third plurality of routes from the departure point to the corresponding destination point.

9. A computer program product comprising a computer readable storage medium tangibly embodying a computer readable program code having computer readable instructions stored thereon, wherein the computer readable storage medium is hardware, and which, when implemented, cause a computer to carry out the steps of a method for selecting a route comprising:

preparing a graph expressing road segments as edges and route intersections as nodes, the road segments and the route intersections combining to form a first plurality of routes, and each road segment including a weight, the weight equal to a traveling time of each road segment;

searching the graph for a second plurality of routes in response to each of a plurality of requests, each request including a set of points, each set including a departure point and a corresponding destination point;

determining a minimum cost of each of the second plurality of routes, the minimum cost equal to a cost when traffic volume is zero, wherein the cost is equal to a sum of the weights of each road segment;

establishing the second plurality of routes as a set of routes to be processed, each of the second plurality of routes including at least one set of points, and one or more road segments and one or more route intersections connecting the departure point and the corresponding destination point of the at least one set of points;

solving an objective function, where the function iterates to minimize a maximum value obtained by dividing an actual required time of each of the second plurality of routes from each departure point to the corresponding destination point by the minimum cost of each of the second plurality of routes, wherein the actual required time is equal to the cost of each of the second plurality of routes;

determining, based on the objective function, a current best solution, wherein the current best solution is one route of the second plurality of routes with a lowest value obtained by solving the objective function;

determining the cost of the current best solution;

responsive to determining the current best solution, the computer removing (a) each of the routes whose minimum cost is greater than the cost of the current best solution, and (b) each of an unused route added in a previous iteration, wherein each unused route is a route of the first plurality of routes not contained in the second plurality of routes; and repeating the solving of the objective function with each route of the second plurality of routes that is not removed.

10. The computer program product of claim 9, which when implemented, causes the computer to carry out the steps of the method for selecting a route, further comprising:

adding to the set of routes to be processed any route lowering the objective function when added; and repeating the solving of the objective function.

11. The computer program product of claim 10, which when implemented, causes the computer to carry out the steps of the method, wherein the adding step to the set of routes to be processed further comprises:
  determining one or more route requests of the plurality of requests having a same actual required time as one or more candidate routes, wherein the one or more candidate routes include each route of the second plurality of routes that remains after the removing step;
  setting the determined one or more route requests as bottleneckRequests;
  setting an edge included with the one or more candidate routes as a bottleneckEdge; and
  searching for one or more routes with a cost less than the current best solution, using the cost and not using the bottleneckEdge.

12. The computer program product of claim 11, which when implemented, causes the computer to carry out the steps of the method, further comprising:
  searching for one or more routes using the bottleneckEdge in response to not finding a route in the step of searching for one or more routes using the cost and not using the bottleneckEdge.

13. The computer program product of claim 9, which when implemented, causes the computer to carry out the steps of the method for selecting a route, wherein the objective function is solved by a solver.

14. The computer program product of claim 13, which when implemented, causes the computer to carry out the steps of the method for selecting a route, wherein each of the plurality of requests further includes a demand level, wherein the demand level is a number of vehicles traveling between each departure point and corresponding destination point, and the solver outputs a percentage of the demand level for a third plurality of routes from the departure point to the corresponding destination point.

15. A computer implemented system for selecting a route, the system comprising:
  one or more processors, one or more computer readable storage mediums, and computer readable program instructions stored on the one or more storage mediums for execution by at least one of the one or more processors, wherein the one or more computer readable storage mediums are hardware, the program instructions comprising program instructions configured to:
  preparing a graph expressing road segments as edges and route intersections as nodes, the road segments and the route intersections combining to form a first plurality of routes, and each road segment including a weight, the weight equal to a traveling time of each road segment;
  searching the graph for a second plurality of routes in response to each of a plurality of requests, each request including a set of points, each set including a departure point and a corresponding destination point;
  determining a minimum cost of each of the second plurality of routes, the minimum cost equal to a cost when traffic volume is zero, wherein the cost is equal to a sum of the weights of each road segment;
  establishing the second plurality of routes as a set of routes to be processed, each of the second plurality of routes including at least one set of points, and one or more road segments and one or more route intersections connecting the departure point and the corresponding destination point of the at least one set of points;
  solving an objective function, where the function iterates to minimize a maximum value obtained by dividing an actual required time of each of the second plurality of routes from each departure point to the corresponding destination point by the minimum cost of each of the second plurality of routes, wherein the actual required time is equal to the cost of each of the second plurality of routes;
  determining, based on the objective function, a current best solution, wherein the current best solution is one route of the second plurality of routes with a lowest value obtained by solving the objective function;
  responsive to determining the current best solution, removing (a) each of the routes whose minimum cost is greater than the cost of the current best solution, and (b) each of an unused route added in a previous iteration, wherein each unused route is a route of the first plurality of routes not contained in the second plurality of routes; and
  repeating the solving of the objective function with each route of the second plurality of routes that is not removed.

16. A system for selecting a route according to claim 15, further comprising program instructions configured to:
  adding to the set of routes to be processed any route lowering the objective function when added; and -repeating the solving of the objective function.

17. A system for selecting a route according to claim 16, wherein the program instructions for adding to the set of routes to be processed further comprises:
  determining one or more route requests of the plurality of route requests having a same actual required time as one or more candidate routes, wherein the one or more candidate routes include each route of the second plurality of routes that remains after the removing step;
  setting the determined one or more route requests as bottleneckRequests;
  setting an edge included with the one or more candidate routes as a bottleneckEdge; and
  searching for one or more routes with a cost less than the current best solution, using the cost and not using the bottleneckEdge.

18. A system for selecting a route according to claim 17, further comprising program instructions configured to:
  searching for one or more routes using the bottleneckEdge in response to not finding a route in the step of searching for one or more routes using the cost and not using the bottleneckEdge.

19. A system for selecting a route according to claim 15, wherein each of the plurality of requests includes a set of a departure point, a corresponding destination point, and a demand level, wherein the demand level is a number of vehicles traveling between each departure point and corresponding destination point, and a solver outputs a percentage of the demand level for a third plurality of routes from the departure point to the corresponding destination point.

* * * * *